T. VARNEY.
ARC WELDING APPARATUS.
APPLICATION FILED SEPT. 18, 1911.
1,095,300.
Patented May 5, 1914.
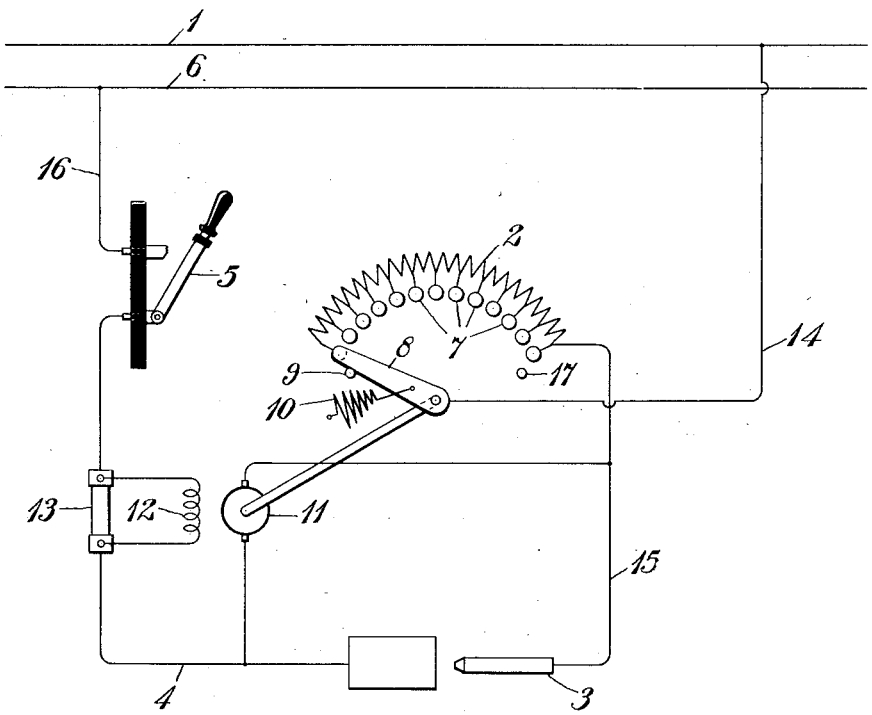
WITNESSES:
Fred H. Miller
INVENTOR
Theodore Varney
BY
Shirley G. Carr
ATTORNEY

UNITED STATES PATENT OFFICE.

THEODORE VARNEY, OF PITTSBURGH, PENNSYLVANIA, ASSIGNOR TO WESTINGHOUSE ELECTRIC AND MANUFACTURING COMPANY, A CORPORATION OF PENNSYLVANIA.

ARC WELDING APPARATUS.

1,095,300. Specification of Letters Patent. Patented May 5, 1914.

Application filed September 18, 1911. Serial No. 649,917.

*To all whom it may concern:*

Be it known that I, THEODORE VARNEY, a citizen of the United States, and a resident of Pittsburgh, in the county of Allegheny and State of Pennsylvania, have invented a new and useful Improvement in Arc Welding Apparatus, of which the following is a specification.

My invention relates to electric welding and particularly to the control of the circuits for arc welding.

The object of my invention is to provide a simple control system adapted to automatically govern the current in the welding circuit of arc welding outfits whereby the welding current may be maintained substantially constant and the operation of the outfit materially improved.

According to my present invention, I provide a variable resistance in the welding circuit, an electric motor for adjusting the amount of resistance included in the circuit having an armature which is connected in shunt relation to the welding arc and a field magnet winding which is connected either in series with the welding circuit or in a derived circuit therefrom.

The single figure of the accompanying drawing is a diagrammatic view of a system of control arranged in accordance with my invention.

Referring to the drawing, energy is supplied from any suitable source through line conductor 1 and a variable resistance 2 to an arc welding electrode 3, circuit being completed from the work on which the welding is being done, through a conductor 4, a switch 5 and opposite line conductor 6.

The variable resistance 2 is connected at its ends and at various intermediate points to a plurality of stationary contact members 7 in the usual manner, which are arranged substantially in the arc of a circle and may be successively engaged by a movable contact arm 8. The arm 8 is normally held in its off position against a stop 9 by means of a spring 10, in which position all of the resistance 2 is included in the welding circuit.

The movable arm 8 is operatively connected to an armature 11 of a small control motor which is provided with a field magnet winding 12. The armature of the motor is connected in shunt circuit relation to the welding arc, while the field magnet winding 12 is connected to the terminals of a shunt 13, which is included in the welding circuit. The motor field magnet winding may be included directly in the welding circuit and the shunt 13 omitted within the spirit and scope of my invention.

The operation of the system is as follows: Assuming that the parts occupy the positions shown in the drawings, the arm 8 being in its off position and the switch 5 being opened, if the switch 5 is closed and the electrode 3 is brought into engagement with the surface to be welded, a circuit is completed from line conductor 1, through conductor 14, arm 8, resistance 2, conductor 15, electrode 3, conductor 4, the shunt 13 and the field magnet winding 12, the switch 5 and conductor 16 to line conductor 6. As long as the electrode is in engagement with the surface of the work, the resistance is so low that practically no voltage is applied to the motor armature 11. As soon as the electrode is drawn away from the work an arc is established and its resistance is sufficient to impress a material voltage across the motor armature and produce such a rotation of the arm 8, as to exclude the resistance 2. The greater the resistance of the arc, the higher the speed of the motor, and, on the other hand, if the electrode is again brought into engagement with the work, the voltage will be cut off in the motor armature and the spring 10 will immediately return the arm 8 to its initial position.

From the foregoing, it is evident that the current of the welding circuit will be substantially constant.

If the arm 8 is rotated sufficiently to exclude the whole of the resistance 2, it will come into engagement with a stop 17 and, while the motor will still produce a torque, its armature will be at rest.

I do not desire to be limited to the specific arrangement illustrated since it is evident that variations may be effected in the circuit connections and in the arrangement of parts without departing from the spirit of my invention.

I claim a my invention:

1. A system of arc welding comprising a welding circuit, a variable resistance therefor and a resistance varying motor having an armature connected in shunt circuit relation to the welding arc.

2. A system of arc welding comprising a welding circuit, a variable resistance therefor and a resistance varying motor having an armature connected in shunt circuit relation to the welding arc and a field magnet winding which is energized in response to the current traversing the welding circuit.

3. A system of arc welding comprising a welding circuit, a variable resistance therefor, a shunt connected to the welding circuit and a resistance varying motor having an armature connected in shunt circuit relation to the welding arc and a field magnet winding connected to the terminals of said shunt.

4. A control system comprising an electric arc-producing means, a constant potential source of energy, a variable resistance in circuit with the arc and means for varying the resistance to maintain a substantially constant current through the arc circuit, said means comprising a motor having armature and field magnet windings, one of said windings being responsive to the current in the welding circuit and the other responsive to the voltage across the arc.

In testimony whereof, I have hereunto subscribed my name this 12th day of September, 1911.

THEODORE VARNEY.

Witnesses:
D. H. MACE,
B. B. HINES.